Figure 1:
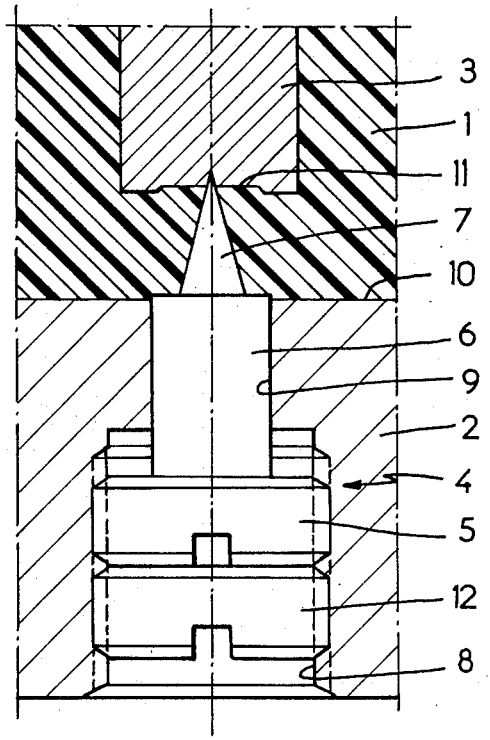

United States Patent [19]

Broux

[11] 3,970,734
[45] July 20, 1976

[54] METHOD OF FORMING A CALIBRATED APERTURE IN A MOLDED ARTICLE

[75] Inventor: Roland Broux, Monnetier-par-Saint-Jorioz, France

[73] Assignee: S.T. Dupont, Paris, France

[22] Filed: Feb. 5, 1974

[21] Appl. No.: 439,757

[30] Foreign Application Priority Data
Feb. 7, 1973  France .............................. 73.04230

[52] U.S. Cl. ................................ 264/219; 264/328
[51] Int. Cl.² .......................... B29F 1/00; B29C 5/00
[58] Field of Search ........... 264/275, 328, 154, 329, 264/219; 425/242 R, 182, 190, 468, DIG. 10, 249; 249/142, 145, 155

[56] References Cited
UNITED STATES PATENTS

| | | | |
|---|---|---|---|
| 1,832,570 | 11/1931 | Montgomery | 222/402.1 |
| 2,361,348 | 10/1944 | Dickson et al. | 425/468 |
| 2,376,742 | 5/1945 | Wempe | 264/317 |
| 3,040,384 | 6/1962 | Whittington | 264/275 |
| 3,136,001 | 6/1964 | Gelbard | 249/155 |
| 3,208,750 | 9/1965 | Firth et al. | 264/328 |
| 3,236,491 | 2/1966 | Keinänen | 264/275 |
| 3,284,556 | 11/1966 | Hay | 264/317 |
| 3,330,004 | 7/1967 | Cloyd et al. | 425/468 |
| 3,752,434 | 8/1973 | Herter | 425/468 |

*Primary Examiner*—Willard E. Hoag
*Attorney, Agent, or Firm*—Haseltine, Lake & Waters

[57] ABSTRACT

A method of molding a part having a calibrated aperture including actuating a tapered pin in an aperture of a female mold wall so that the pin engages and penetrates a desired distance into a core member disposed within the female mold, forming its own housing in the core. Molding material is then molded between the female mold wall and the core member and about the pin so that a calibrated aperture is formed in the molded article.

7 Claims, 4 Drawing Figures

METHOD OF FORMING A CALIBRATED APERTURE IN A MOLDED ARTICLE

The present invention relates to a method for moulding a part provided with apertures moulded with the part and it also relates to the apparatus for carrying out this method.

When a wall of a part to be moulded has to be simultaneously provided with an aperture, a pin is generally used whose external dimensions correspond to the internal dimensions of the aperture.

In a first known moulding method, the pin is integral with the impression wall of the mould and is flush with the inner surface of the core or cover of the mould. A method of this type has a double draw-back. On the one hand, since the pin is only fixed at one end, there is a risk that it will buckle under the action of the moulding pressures used during the injection and, on the other hand, it is very difficult to machine two flat surfaces such that they come into complete and precise contact. In the case of inaccurate machining, there is a risk that the material to be moulded may penetrate the gaps left between the pin and the core or the cover and it is thus necessary to undertake special machining of the aperture obtained to give it the desired dimensions.

This is why it is preferable to provide, in the mould, a corresponding housing at the free end of the pin. A measure of this type makes it possible to reduce the risk of buckling of the pin. In addition, it is easier to machine a cylindrical pin and a cylindrical housing than to machine two flat surfaces and an aperture with very precise dimensions may thus be obtained.

However, this second method is not always applicable in the case where it is desired to obtain an aperture of two restricted dimensions. Indeed, it is impossible to machine a pin of several tens of thousandths of a millimeter diameter and a corresponding housing in the core industrially, i.e. at competitive prices.

It is an object of the present invention to remedy the drawbacks of said second method, while retaining the advantages that this method provides with respect to the first above-described method. To this end, the invention relates to a moulding method which is firstly characterized in that the materials chosen for producing the pin and the moulding core and secondly, the shape of the end of the pin which, during moulding, is in contact with the core, are such that the pin penetrates the core, at the time of its positioning for moulding, in order to form its own housing therein.

For example, it is possible to choose an unhardened core and a hardened conical pin in order that the latter may penetrate the core by an amount which may be predetermined in advance depending on the position of the pin with respect to the core. In the finished moulded part, a frustoconical passage is obtained terminating at the face of said part in an aperture whose diameter corresponds to that desired. Hereafter, the term "calibrated" aperture refers to such an aperture of desired diameter.

The method according to the invention thus makes it possible to eliminate buckling of the pin, since it is retained on either side. It also makes it possible to eliminate machining of the housing in the core. Finally, this method ensures an effective seal between the pin and core, which makes it possible to obtain a calibrated aperture in the moulded part.

Figure 2:
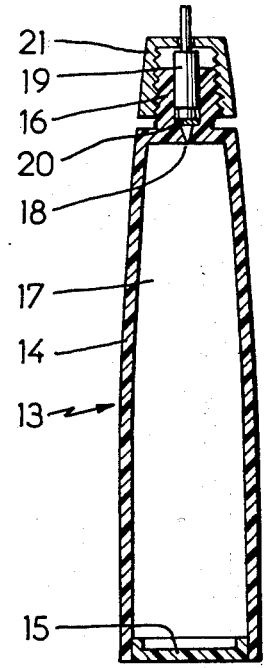
Figure 3:
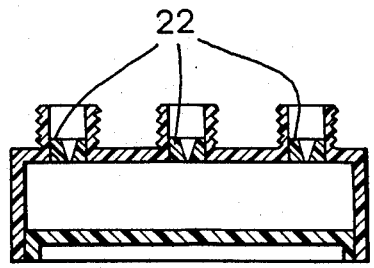
Figure 4:
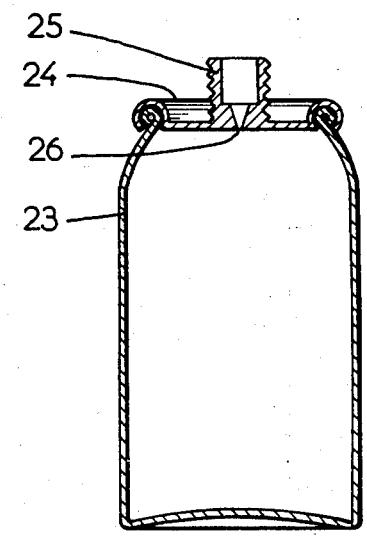

The invention will now be described with reference to the accompanying drawings in which:

FIG. 1 is a partial sectional view of a part being moulded by a method according to the invention and FIGS. 2 to 4 represent sectional views of applications of the method according to the invention to a liquefied gas lamp, to a storage tank for a plate-warmer and to a bottle respectively.

In FIG. 1, a mould is used comprising an impression or mould wall 2, a moulding core 3 and a pin 4.

The pin 4 comprises a screw-threaded head 5 and a cylindrical body 6 terminated by a tapered end in the form of a conical point 7. The impression 2 is provided with a tapped housing 8 to receive the screw-threaded head 5 and the housing is extended in the form of a cylindrical passage 9 of a diameter equal to that of the cylindrical body 6. The head 5 of the pin is screwed into the tapped housing 8 and locked by a lock-nut 12.

According to the invention, the pin 4 is made from a harder material than that of the core 3 and projects above the inner surface 10 of the impression, by a height such that during the positioning of the core 3 on the impression, it penetrates the latter to a predetermined depth such that the face 11 of the moulded part 1 comprises an aperture defined by the intersection of the part 7 of the pin 4 and of the plane of said face 11.

An interesting application of the invention resides in the moulding of parts which may fulfill the function of a flow-limiter in distributors for pressurized gas, such as butane, propane or aerosols.

Another application of the invention resides in the manufacture of the apparatus itself, ensuring the storage and distribution of pressurized gas, this apparatus being able to be moulded in a single operation with its flow-limiter.

Thus, the principle of the invention may be applied to produce a lamp 13, such as shown in FIG. 2.

The lamp essentially comprises a moulded hollow body 14, serving for storing the pressurized gas and comprises an externally screw-threaded neck 16. At the opposite end to this neck 16, the hollow body 14 is closed by a welded stopper 15.

The neck 16 is connected to the storage tank 17 through the intermediary of a calibrated aperture 18 obtained by the afore-described method. A burner 19 is slidably mounted inside the neck 16 and rests on a gasket 20 which ensures the closure of the aperture 18. The burner passes through the upper wall of a closure cap 21 which is screwed onto the screw-threaded neck 16 and which, when it is screwed down, keeps the burner and the gasket pressed tightly against the aperture 18. When the cap is unscrewed slightly, since the burner and the gasket are thus urged upwards by the pressure of the gas, the latter escapes through the burner.

The storage tank for plate-warmers illustrated in FIG. 3 is of similar construction to that of the lamp with the exception of the parts 22 comprising outlet apertures for the gas, which parts are moulded independently of the body of the storage tank and subsequently fixed to the latter.

FIG. 4 shows a bottle of gas comprising a body 23 on which is sealably fixed a moulded cover 24 including a threaded neck 25 which is externally open and is provided with a calibrated orifice 26.

Naturally, it is possible, without diverging from the invention, to modify operational details or constructional details or their arrangement with a view to obtaining the same result.

Although the embodiments given relate to liquified gas apparatus, i.e. to apparatus in which the inherent pressure of the gaseous atmosphere is sufficient to ensure the distribution of the gaseous phase outside the apparatus, it is possible, for example, to apply the invention to aerosols whose distribution is ensured by a propellent gas which is different from the product distributed or by any other hydraulic or mechanical system.

It would also be possible to produce the core 3 from two materials, only the part of this core in which the end of the pin is housed being of a material which is less hard than that of said end.

In order to decrease the quantity of material to be driven out from the core, it would also be possible to rough-out a housing in the latter at the point where the end of the pin is housed.

The end of the pin could also have a shape other than conical, for example in relation to the rough housing provided in the preceding paragraph.

I claim:

1. A method of molding a part with a tapered passage therein and a calibrated aperture at the end of said passage, said method comprising providing a mold core and a mold wall in spaced relation, mounting a tapered pin in the mold wall for displacement towards the mold core, said pin being formed with an end facing the mold core which is of pointed shape, said pin being formed of a material harder than that of the facing portion of the mold core, moving said pin towards the core to cause said pointed end to penetrate into a face of said core and form its own housing therein so that the pin is supported at both ends thereof, permitting penetration of said tapered pin into said core to a pre-determined depth to obtain a particular cross-sectional area of the tapered pin at the face of the core, injection moulding a material between said mold core and mold wall to form a part having a tapered passage therein defined by said tapered pin with a calibrated aperture at the end of said passage whose size corresponds to that of said particular cross-sectional area of the tapered pin at said face, and removing said pin from said passage and separating said molded part from the molding wall and molding core.

2. A method according to claim 1 wherein the penetration of the pin into the mold core is facilitated by forming a rough housing in the latter.

3. A method according to claim 1 wherein said pin is moved towards the core by rotating said pin in the mold wall.

4. A method according to claim 1 wherein said pointed end of the pin is conical.

5. A method according to claim 1 wherein the pin is threadably mounted in the mold wall for effecting said displacement towards the core.

6. A method according to claim 1 wherein said aperture in the molded part is calibrated to serve as a flow limiter in distributors for pressurized gas.

7. A method according to claim 1 wherein said molded part is formed as a vessel for storage of pressurized gas and said aperture is calibrated to serve as a flow limiter for distribution of the gas.

* * * * *